UNITED STATES PATENT OFFICE.

WILHELM HERZBERG, OF BERLIN-WILMERSDORF, AND OSWALD SCHARFENBERG, OF BERLIN-SCHONEBERG, GERMANY, ASSIGNORS TO ACTIEN GESELLSCHAFT FÜR ANILIN FABRIKATION, OF BERLIN, GERMANY.

ORTHO-OXYAZO DYES.

1,426,189.   Specification of Letters Patent.   Patented Aug. 15, 1922.

No Drawing.   Application filed November 5, 1921.   Serial No. 513,169.

*To all whom it may concern:*

Be it known that we, WILHELM HERZBERG and OSWALD SCHARFENBERG, citizens of the German Republic, residing at Berlin-Wilmersdorf, Germany, and Berlin-Schoneberg, Germany, our P. O. address being Prinzregentenstr. 10, Berlin-Wilmersdorf, Germany, and Rosenheimerstr. 12, Berlin-Schoneberg, Germany, have invented certain new and useful Improvements in Ortho-Oxyazo Dyes, of which the following is a specification.

Our present invention relates to new ortho-oxy-azo-dyes which may be obtained by combining a polyhalogen-2-diazo-1-oxy derivative of the benzene series with a mono oxynaphthalene-sulfonic acid.

These new dyes form in the dry pulverized shape of their sodium salts dark powders soluble in water with a violet color the aqueous solution becoming more reddish by addition of sodium carbonate and orange to red by addition of sodium hydroxide, by an acid an orange to red precipitate being separated.

The new dyes when dyed in the presence of an alkali metal chromate and an ammonium salt, such as ammonium sulfate, furnish on wool reddish-blue to violet tints of an excellent fastness to the action of light, to washing and to milling; the same shades being obtained by dyeing on wool mordanted with a chromium mordant or by dyeing wool in an acid bath and treating these tints afterwards with chromium mordants.

In order to illustrate our invention the following examples are given the parts being by weight:

1. 21.3 parts of 3.4.6-trichlor-2-amino-1-oxybenzene are diazotized by means of 6.9 parts of sodium nitrite and 50 parts of hydrochloric acid of 12° Bé. specific gravity. The diazo compound is allowed to run into a solution of 25 parts of 1-oxynaphthalene-4-sulfonic acid (sodium salt), alkaline with sodium carbonate. The dyestuff is salted out and worked up as usual. It dyes wool with chromium mordants violet tints of a very good fastness.

2. The diazo compound of 24.7 parts of 3.4.5.6-tetra-chlor-2-amino-1-oxybenzene is coupled with 25 parts of 1-oxynaphthalene-5-sulfonic acid (sodium salt) in a solution containing sodium carbonate. The dyestuff separated in the usual manner dyes wool with chromium mordants reddish-blue tints.

3. 21.3 parts of 3.4.6-trichlor-2-amino-1-oxybenzene are diazotized in the usual manner and the diazo compound is allowed to run into a solution of 25 parts of 2-oxynaphthalene-6-sulfonic acid (sodium salt), alkaline with sodium carbonate. The dye is separated and worked up in the usual manner; it dyes on wool with chromium mordants red-violet tints of an excellent fastness.

It is obvious to those skilled in the art that our invention is not limited to the foregoing examples or to the details given therein. Similar dyes may be obtained for example by substitution for the trichlor-2-amino-1-oxybenzenes in the examples 1 and 3, their homologues.

The new dyes correspond to the general formula:

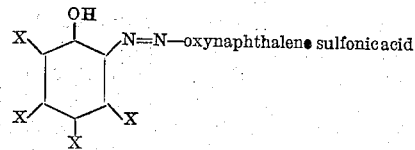

X indicating hydrogen, alkyl, halogen; at least two of them being halogen.

What we claim is—:

1. The new ortho-oxy-azo-dyes which form in the dry pulverized shape of their sodium salts dark powders soluble in water with a violet color, from which an acid separates an orange to red precipitate, the aqueous solution becoming more reddish by addition of sodium carbonate and orange to red by addition of sodium hydroxide, yielding upon reduction a polyhalogen-2-amino- 1-oxy-derivative of the benzene series and an amino-monoxy-naphthalene sulfonic acid, dyeing on wool in the presence of an alkaline metal chromate and an ammonium salt, such as ammonium sulfate, reddish-blue to violet tints of an excellent fastness, the same shades being obtained by dyeing on wool mordanted with a chromium mordant or by dyeing wool in an acid bath and treating these tints afterwards with chromium mordants, which dyes may be obtained by combining a polyhalogen-2-diazo-1-oxy-derivative of the benzene series with a mono oxy-naphthalene-sulfonic acid.

2. The new ortho-oxy-azo-dyes which form in the dry pulverized shape of their sodium salts dark powders soluble in water with a violet color from which an acid separates an orange to red precipitate, the aqueous solution becoming more reddish by addition of sodium carbonate and orange to red by addition of sodium hydroxide, yielding upon reduction a polyhalogen-2-amino-1-oxybenzene and an amino-mono-oxy-naphthalene-sulfonic acid dyeing on wool in the presence of an alkali metal chromate and an ammonium salt (such as ammonium sulfate), reddish-blue to violet tints of an excellent fastness, the same shades being obtained by dyeing on wool mordanted with a chromium mordant or by dyeing wool in an acid bath and treating these tints afterwards with chromium mordants, which dyes may be obtained by combining a polyhalogen-2-diazo-1-oxybenzene with a monooxynaphthalene-sulfonic acid.

3. The new ortho-oxy-azo-dye which form in the dry pulverized shape of their sodium salts dark powders soluble in water with a violet color, from which an acid separates an orange to red precipitate, the aqueous solution becoming more reddish by addition of sodium carbonate and orange to red by addition of sodium hydroxide yielding upon reduction trihalogen-2-amino-1-oxybenzene and an amino-oxynaphthalene-sulfonic acid, dyeing on wool in the presence of an alkali metal chromate and an ammonium salt, such as ammonium sulfate, reddish-blue to violet tints of an excellent fastness, the same shades being obtained by dyeing on wool mordanted with a chromium mordant or by dyeing wool in an acid bath and treating these tints afterwards with chromium mordants, which dyes may be obtained by combining a trihalogen-2-diazo-1-oxybenzine with an oxy-naphthalene-sulfonic acid.

4. The new ortho-oxy-azo-dyes which form in the dry pulverized shape of their sodium salts dark powders soluble in water with a violet color, from which an acid separates an orange to red precipitate, the aqueous solution becoming more reddish by addition of sodium carbonate and orange to red by addition of sodium hydroxide, yielding upon reduction trichlor-2-amino-1-oxybenzene and an amino-oxy-naphthalene-sulfonic acid, dyeing on wool in the presence of an alkali metal chromate and an ammonium salt, such as ammonium sulfate, reddish-blue to violet tints of an excellent fastness, the same shades being obtained by dyeing on wool mordanted with a chromium mordant or by dyeing wool in an acid bath and treating these tints afterwards with chromium mordants, which dyes may be obtained by combining a trichlor-2-diazo-1-oxybenzene with an oxy-naphthalene-sulfonic acid.

5. The new ortho-oxy-azo-dyes which form in the dry pulverized shape of their sodium salts dark powders soluble in water with a violet color, from which an acid separates an orange to red precipitate, the aqueous solution becoming more reddish by addition of sodium carbonate and orange to red by addition of sodium hydroxide, yielding upon reduction a trichlor-2-amino-1-oxybenzene and a 2-amino-1-oxy-naphthalene-sulfonic acid, dyeing on wool in the presence of an alkali metal chromate and an ammonium salt, such as ammonium sulfate, reddish-blue to violet tints of an excellent fastness, the same shades being obtained by dyeing on wool mordanted with a chromium mordant or by dyeing wool in an acid bath and treating these tints afterwards with chromium mordants, which dyes may be obtained by combining a trichlor-2-diazo-1-oxybenzene with a 1-oxy-naphthalene-sulfonic acid.

6. The new ortho-oxy-azo-dyes which form in the dry pulverized shape of their sodium salts dark powders soluble in water with a violet color, from which an acid separates an orange to red precipitate, the aqueous solution becoming more reddish by addition of sodium carbonate and orange to red by addition of sodium carbonate, yielding upon reduction 3.4.6-trichlor-2-amino-1-oxybenzene and a 2-amino-1-oxynaphthalene-sulfonic acid, dyeing on wool in the presence of an alkali metal chromate and an ammonium salt, such as ammonium sulfate, reddish-blue to violet tints of an excellent fastness, the same shades being obtained by dyeing on wool mordanted with a chromium mordant or by dyeing wool in an acid bath and treating these tints afterwards with chromium mordants, which dyes correspond as free acids to the general formula:

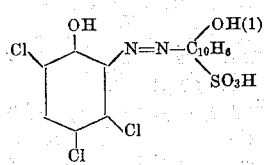

7. The new ortho-oxy-azo-dye which forms in the dry pulverized shape a dark powder soluble in water with reddish-violet color from which an acid separates a red precipitate, the aqueous solution becoming bluish-red by addition of sodium carbonate and orange by addition of sodium hydroxide, yielding upon reduction 3.4.6-trichlor-2-amino-1-oxybenzene and 2-amino-1-oxy-naphthalene-4-sulfonic acid, dyeing on wool in the presence of an alkali metal chromate and an ammonium salt, such as ammonium sulfate violet tints of excellent fastness, the same shades being obtained by dyeing on wool mordanted with a chromium mordant or by dyeing wool in an acid bath and treating these tints afterwards with chromium mordants, which dye corresponds as free acid to the formula:

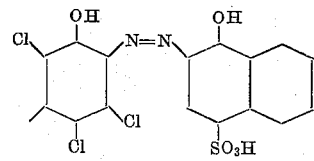

In testimony whereof we affix our signatures in presence of two witnesses.

WILHELM HERZBERG.
OSWALD SCHARFENBERG.

Witnesses:
 MAX BRAUM,
 WALTER JOHANNES.